Patented Apr. 3, 1951

2,547,069

UNITED STATES PATENT OFFICE 2,547,069

QUICK-SETTING INKS AND METHOD OF MAKING

Richard H. Wharton, Dayton, Ohio, assignor to The Standard Register Company, Dayton, Ohio, a corporation of Ohio No Drawing. Application September 10, 1947, Serial No. 773,319

15 Claims. (Cl. 260—15)

This invention relates to printing inks of a rapid setting type.

In the printing industry, since high speed presses are commonly employed, rapidity with which the ink dries is an important consideration. If the ink is slow drying, marring or backing pages by offset or sticking together occurs. Also, in the conventional multicolor printing time must be allowed for the first colors to dry before the next is applied, whereas if instantaneous dry on the paper were possible, the different colors could be impressed, one immediately after the other. Printing ink of the type herein described is designed to dry as little as possible on the press but to dry quickly, such as within five seconds on the paper.

The drying or settling qualities of quick drying inks commonly in use depends upon the type of inks. With the volatile solvent type inks the drying is accomplished through the evaporation of the volatile portion of the vehicle to leave solid components. With mineral oil inks the drying results by absorption into the non-calendered paper which is used. Inks compounded with heat hardening resins depend upon the application of heat to the printed sheet as by an open flame or heated rollers to expedite the hardening or setting.

It is an object of the present invention to provide an improved printing ink which permits the press to operate at top speed without requiring the use of offset preventing means and without impairing the original sharpness of the impression.

It is a further object of this invention to provide an improved ink which does not require heat to set the ink which is applied to the paper in the ordinary manner.

It is a more particular object of the present invention to provide an improved printing ink which dries within a few seconds in an atmosphere of sulfur dioxide after application of the ink to paper by the modern high speed presses in the conventional manner.

Other objects and advantages will become apparent as the description proceeds.

The rapid drying inks of the present invention owe their setting properties to the incorporation of a furfural 2.4 diamino toluene polymer or partial condensation product, which hardens very rapidly under the influence of gaseous sulfur dioxide when the ink is applied to a surface in a thin film, such as in a printing operation upon paper. The general procedure for making the ink composition herein described is to provide a more or less fluid mass of the furfural 2.4 diamino toluene polymer or partial condensation product in an organic liquid vehicle therefor. The coloring matter is dispersed in this. The order in which these three necessary components are brought together is not critical, although this and the type of liquid vehicle and other constituents may make for a preference. Modifying agents may be employed to change such properties as flow, tack or body. Examples of these are cellulose derivatives, such as the cellulose ethers or esters, various waxes, natural or synthetic resins. The vehicle and diluent is preferably tetra hydro fural phthalate, in which case it is desirable to add an emulsifier. Or it may be a heavy refined mineral oil, in which case the emulsifier can be dispensed with. The cellulose ether which is very adaptable is ethyl cellulose, but of course the matter of commercial availability and price influence the choice primarily; other ethers of cellulose can be selected. Pigments used are obtained from natural sources or may be manufactured. The pigments selected will depend upon the color desired but preferably should be inert to the constituents of the ink and sulfur dioxide gas. Blacks represent the most generally used color but blues are frequently used with equal success.

The vehicles or diluents are preferably high boiling. This is partly because the rate of evaporation should be such that the ink remains workable on the press for an indefinite period. They should be water insoluble.

It will be pointed out that in making the quick setting ink of the present invention the furfural and the 2.4 diamino toluene in the presence of the solvents or the vehicles with the emulsifiers undergo a reaction or condensation at room temperature. The rate of reaction is quite slow. So when the composition is initially formulated it is a more or less fluid mass. When the ink is applied by the press to paper and the thinly applied ink subjected to an atmosphere of gaseous sulfur dioxide for a few seconds, such as five or several additional seconds, the polymer or partial condensation product changes to a hard insoluble state. The sulfur dioxide catalyzes the reaction, but this change to the solid condition takes place only after application of the ink to the paper. This takes place at room temperature. Of course, heat can be applied to the unprinted paper but it is not necessary.

The following examples will more clearly describe the nature and objects of the invention but they are given merely to illustrate the invention and are not to be construed in a limiting sense; parts are given by weight.

EXAMPLE 1.—BLACK INK

*Formula*

20 parts furfural
4 parts "Rezyl #12"[1]
1 part emulsifier #87 [2]
1 part ethyl cellulose
12 parts tetra hydro fural phthalate
5 parts 2.4 diamino toluene
8 parts carbon black As a convenient method of mixing it is recommended that the "Rezyl #12," ethyl cellulose and the emulsifier be put in solution in the furfural with stirring. The 2.4 diamino toluene may be made into a paste or slurry with the tetra hydro fural phthalate and mixed with the furfural containing the other dissolved constituents of the formula. The coloring agent, carbon black, is added, whereupon the whole composition is passed through a roller mill having water cooled rolls.

When this resulting ink is printed on paper in a conventional manner, and the imprinted paper exposed to gaseous sulfur dioxide at ordinary temperature, the ink sets in five seconds.

EXAMPLE 2.—BLUE INK

*Formula*

20 parts furfural
4 parts "Rezyl #12"
1 part emulsifier #87
1 part ethyl cellulose
12 parts tetra hydro fural phthalate
5 parts 2.4 diamino toluene
8 parts Iron Blue, such as Milori Blue When the constituents are mixed, as in Example 1 supra, a blue ink setting in five seconds in sulfur dioxide without the addition of heat is obtained.

EXAMPLE 3

*Formula*

20 parts furfural
2 parts Vinylite resin AYAA[3]
1 part ethyl cellulose
10 parts heavy refined mineral oil—grade 2
5 parts 2.4 diamino toluene
5 parts carbon black The Vinylite resin and ethyl cellulose are stirred into solution with furfural; then the 2.4 diamino toluene is stirred into a paste with the refined heavy mineral oil. The furfural containing its dissolved constituents is then mixed with the oil paste, the carbon black is added, and the whole composition thereupon passed through a roller mill having water cooled rolls.

When this black ink is printed on paper in a conventional manner, and the imprinted paper exposed to gaseous sulfur dioxide without applying heat, the ink sets in five seconds.

It will be seen from the above description and

---

[1] "Rezyl #12" is a glycerol-phthalate alkyd resin which is modified with a non-drying oil. It is manufactured by American Cyanamid Company.
[2] "Emulsifier #87" is a neutral polyoxyethylene stearyl phosphate which is manufactured by Victor Chemical Works.
[3] "Vinylite resin AYAA" is a polymer of vinyl acetate alone, which is manufactured by the Bakelite Corporation. Its intrinsic viscosity is 0.39 and its sp. gr. is 1.18.

examples that I have provided an improved printing ink in that it sets without heating within five seconds or a few additional seconds when exposed in the form of a thin film upon a surface such as paper to an atmosphere of gaseous sulfur dioxide.

In the claims the expression "partial condensation product" is employed in the sense as indicating the reaction product which takes place when furfural is intimately mixed with 2.4 diamino toluene in the presence of liquid water-insoluble, organic dispersing agents with emulsifiers or solvents. Whether this reaction which takes place at room temperature is one of polymerization or condensation has not been established by the present inventor. But it is known that the liquid vehicle containing this polymer or partial condensation product is a more or less fluid mass and is considered to be a dispersion of resin. When the diluent or vehicle is a non-volatile, somewhat heavy liquid there is no difficulty of the ink drying on the press. Yet when applied so that there results an extended condition as in printing words upon paper, then exposed to an atmosphere of gaseous sulfur dioxide the ink sets to a hard solid in five seconds or thereabout. This is because the $SO_2$ catalyzes the change of this partial condensation product or polymer to a solid. It will be understood that if the gas surrounding the imprinted paper has other diluting gases the rate of drying will be slower, depending upon the percent of sulfur dioxide. The hard insoluble ink is insoluble in alcohol and benzene and, of course, water.

Since certain changes may be made in the above composition without departing from the scope of the invention, it is intended that unless otherwise qualified all matter contained in the above description shall be interpreted as illustrative and not in a limiting sense.

Having described my invention, what I claim as new and as my invention is:

1. A printing ink comprising a coloring matter dispersed in a liquid containing a partial condensation product of furfural with 2.4 diamino toluene, and an organic water-insoluble non-volatile, liquid diluent the amount of furfural being the largest component based upon weight, which ink will set within substantially 5 seconds in an atmosphere of gaseous sulfur dioxide when applied by conventional methods of printing.

2. A printing ink comprising a coloring matter dispersed in a liquid containing a partial condensation product of furfural with 2.4 diamino toluene, an organic water-insoluble non-volatile liquid diluent the amount of furfural being the largest component based upon weight and a lesser amount of an ether of cellulose, which ink will set within substantially 5 seconds in an atmosphere of gaseous sulfur dioxide when applied by conventional methods of printing.

3. A printing ink comprising a coloring matter dispersed in a liquid containing a partial condensation product of furfural with 2.4 diamino toluene, an organic water-insoluble non-volatile liquid diluent the amount of furfural being the largest component based upon weight and a lesser amount of ethyl cellulose, which ink will set within substantially 5 seconds in an atmosphere of gaseous sulfur dioxide when applied by conventional methods of printing.

4. A printing ink comprising a coloring matter, substantially inert to the other compounds thereof, dispersed in a liquid containing a partial condensation product of furfural with 2.4 diamino toluene, a heavy refined mineral oil the quantity by weight of said oil being greater than the amount of amine, and the amount of furfural being the greatest of any component each based upon weight and a lesser quantity of ethyl cellulose, which ink will set within substantially 5 seconds in an atmosphere of gaseous sulfur dioxide when applied by conventional methods of printing.

5. A printing ink comprising a coloring matter substantially inert to the other components thereof, dispersed in a liquid containing a partial condensation product of furfural with 2.4 diamino toluene, tetra hydro fural phthalate the amount of furfural being the largest component based upon weight and a lesser quantity of ethyl cellulose, which ink will set within substantially 5 seconds in an atmosphere of gaseous sulfur dioxide when applied by conventional methods of printing.

6. A printing ink comprising a carbon black dispersed in a liquid containing a partial condensation product of furfural with 2.4 diamino toluene, tetra hydro fural phthalate, the amount of furfural being the largest component based upon weight and lesser amounts of an emulsifier and ethyl cellulose, which ink will set within substantially 5 seconds in an atmosphere of gaseous sulfur dioxide when applied by conventional methods of printing.

7. A printing ink comprising a blue pigment substantially inert to the other constituents, dispersed in a liquid containing a partial condensation product of furfural with 2.4 diamino toluene, tetra hydro fural phthalate, the amount of furfural being the largest component based upon weight and lesser amounts of an emulsifier and ethyl cellulose, which ink will set within substantially 5 seconds in an atmosphere of gaseous sulfur dioxide when applied by conventional methods of printing.

8. In the process of forming a printing ink capable of setting within substantially five seconds in an atmosphere of gaseous sulfur dioxide when applied in a conventional manner of printing, the steps of intimately mixing furfural with 2.4 diamino toluene in the presence of an organic water-insoluble non-volatile liquid diluent, the amount of furfural being the largest component and the amount of said diluent being greater than the amine each based upon weight, and incorporating coloring matter at some stage into the mixture.

9. In the process of forming a printing ink capable of setting within substantially five seconds in an atmosphere of gaseous sulfur dioxide when applied in a conventional manner of printing, the steps of intimately mixing furfural with 2.4-diamino toluene in the presence of tetra hydro fural phthalate and a small quantity of an emulsifier, the amount of the phthalate being less than the amount of furfural but greater than the amine each based upon weight, and incorporating coloring matter at some stage into the mixture.

10. In the process of forming a printing ink capable of setting within substantially five seconds in an atmosphere of gaseous sulfur dioxide when applied in a conventional manner of printing, the steps of intimately mixing a slurry of 2.4-diamino toluene in tetra hydro fural phthalate with furfural containing an emulsifier, the amount of the phthalate being greater than the amine, and the amount of furfural being the largest component used each based upon weight, and incorporating coloring matter at some stage into the mixture.

11. In the process of forming a printing ink capable of setting within substantially five seconds in an atmosphere of gaseous sulfur dioxide when applied in a conventional manner of printing, the steps of intimately mixing furfural with 2.4 diamino toluene in the presence of an organic water-insoluble non-volatile liquid diluent and a cellulose ether, the amount of furfural being the largest component and the amount of said diluent being greater than the amine each based upon weight, and incorporating coloring matter at some stage into the mixture.

12. In the process of forming a printing ink capable of setting within substantially five seconds in an atmosphere of gaseous sulfur dioxide when applied in a conventional manner of printing, the steps of intimately mixing furfural with 2.4-diamino toluene in the presence of tetra hydro fural phthalate and a small quantity of an emulsifier and a cellulose ether, the amount of the phthalate being less than the amount of furfural but greater than the amine each by weight, and incorporating coloring matter at some stage into the mixture.

13. In the process of forming a printing ink capable of setting within substantially five seconds in an atmosphere of gaseous sulfur dioxide when applied in a conventional manner of printing, the steps of intimately mixing a slurry of 2.4-diamino toluene in tetra hydro fural phthalate with furfural containing an emulsifier and a cellulose ether, the amount of the phthalate being greater than the amine, and the amount of furfural being the largest component used each based upon weight, and incorporating coloring matter at some stage into the mixture.

14. In the process of forming a printing ink capable of setting within substantially five seconds in an atmosphere of gaseous sulfur dioxide when applied in a conventional matter of printing, the steps of intimately mixing a slurry of 2.4-diamino toluene in tetra hydro fural phthalate with furfural containing an emulsifier, the amount of furfural being the largest component based upon weight, and incorporating coloring matter at some stage with the mixture.

15. In the process of forming a printing ink capable of setting within substantially five seconds in an atmosphere of gaseous sulfur dioxide when applied in a conventional manner of printing, the steps of intimately mixing furfural with 2.4-diamino toluene in the presence of an organic water-insoluble non-volatile liquid diluent, the amount of furfural being the largest component by weight, and incorporating color matter at some stage with the mixture.

RICHARD H. WHARTON.

REFERENCES CITED

The following references are of record in the file of this patent:

UNITED STATES PATENTS

| Number | Name | Date |
| --- | --- | --- |
| 1,902,255 | Moss | Mar. 21, 1933 |
| 1,973,918 | Tompkins | Sept. 18, 1934 |
| 2,228,567 | John | Jan. 14, 1941 |